H. A. TOWNE.
HAND HOLE PLATE FOR STEAM GENERATORS.
No. 62,576. Patented Mar. 5, 1867
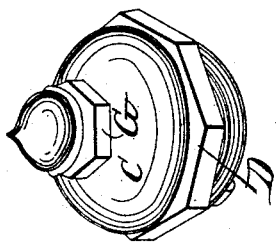
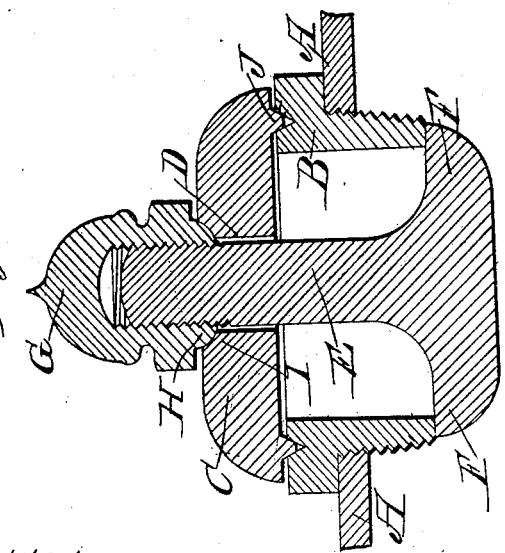

United States Patent Office.

H. A. TOWNE, OF CHICAGO, ILLINOIS.

*Letters Patent No. 62,576, dated March 5, 1867.*

IMPROVEMENT IN HAND-HOLE PLATES FOR STEAM GENERATORS.

*The Schedule referred to in these Letters Patent and making part of the same.*

TO ALL WHOM IT MAY CONCERN:

Be it known that I, H. A. TOWNE, of Chicago, in the county of Cook, and State of Illinois, have invented a new and useful Improvement in Hand-Hole Plates for Locomotive and other Boilers; and I do hereby declare that the following is a full, clear, and exact description of the construction and operation of the same, reference being had to the annexed drawings, and letters of reference marked thereon, making a part of this specification, in which—

Figure 1 is a central sectional elevation of my improved hand-hole plate.

Figure 2 is a perspective representation of the same.

The nature of my invention consists in securing the cap of the hand-hole plate to the plug by means of a T-shaped bolt, on the top end of which is cut a screw-thread, on which is put a hollow nut, the lower end being convex or ball-shaped, and fitting into a depression or socket made in the top of the plate, covering the plug, forming a ball-joint. By this arrangement the joint can be made steam-tight by simply turning the nut down upon the bolt, thus obviating the use of the clamp shown in the patent of J. R. Taylor and H. A. Towne of August 1, 1865, which clamp is expensive and difficult to secure to the boiler, and unless made very strong is liable to spring by the pressure of steam, causing the joint to leak, which is a very serious objection.

To enable others skilled in the art to make and use my invention, I will describe its construction and operation.

The red lines A A represent the plate of the boiler, in which is secured the plug B, which is similar to the plug used by Taylor and Towne. C shows the hand-hole plate, which is also made similar to the one made by them, except the hole D made for the T-bolt to pass through. F is the arms of T-bolt, extending outward from the shank E far enough to bear against the under edge of the plug B. G represents the hollow nut used in forcing the plate C down upon the plug B in order to make the joint between the two steam-tight. H shows the convex part of the nut fitting into the depression I made in the plate C. It will be seen that the hole D is larger than the shank of the T-bolt E, for the purpose of allowing the ball-joint to adjust itself so as to be steam-tight. By this arrangement the V-joint J and the ball-joint H I will be made perfectly steam-tight when the nut G is properly turned down upon the screw-thread made on the end of the bolt E. The plate C can be taken off by removing the nut, after which the bolt E can be taken out or put in by inclining the shank outward toward the top of the plug.

Having thus fully described my device, what I claim, and desire to secure by Letters Patent of the United States, is—

The arrangement and combination of the T-bolt E, hollow nut G, and hand-hole cap C, substantially as described and set forth.

H. A. TOWNE.

Witnesses:
GEO. L. CHAPIN,
A. HAYWARD.